(12) United States Patent
De Boer

(10) Patent No.: US 12,501,850 B2
(45) Date of Patent: Dec. 23, 2025

(54) METHOD FOR OPERATING AN AGRICULTURAL SPREADER AND AN ARRANGEMENT FOR AN AGRICULTURAL SPREADER SYSTEM

(71) Applicant: KVERNELAND GROUP NIEUW-VENNEP B.V., Nieuw-Vennep (NL)

(72) Inventor: Bart De Boer, Nieuw-Vennep (NL)

(73) Assignee: KVERNELAND GROUP NIEUW-VENNEP B.V., Nieuw-Vennep (NL)

(*) Notice: Subject to any disclaimer, the term of this patent is extended or adjusted under 35 U.S.C. 154(b) by 905 days.

(21) Appl. No.: 17/610,577

(22) PCT Filed: Feb. 10, 2021

(86) PCT No.: PCT/EP2021/053125
§ 371 (c)(1),
(2) Date: Nov. 11, 2021

(87) PCT Pub. No.: WO2021/160631
PCT Pub. Date: Aug. 19, 2021

(65) Prior Publication Data
US 2022/0174861 A1    Jun. 9, 2022

(30) Foreign Application Priority Data
Feb. 13, 2020  (EP) ..................................... 20157214

(51) Int. Cl.
*A01C 17/00*    (2006.01)
*A01C 15/00*    (2006.01)
(Continued)

(52) U.S. Cl.
CPC .............. *A01C 17/008* (2013.01); *G06N 3/08* (2013.01); *G06T 7/62* (2017.01); *A01C 15/006* (2013.01);
(Continued)

(58) Field of Classification Search
CPC ... A01C 17/001; A01C 17/008; A01C 15/006; A01C 15/007; A01C 7/085; A01M 7/0089
See application file for complete search history.

(56) References Cited

U.S. PATENT DOCUMENTS 5,353,994 A  * 10/1994  Clark ...................... A23P 20/13
                                                           239/689
12,120,974 B2 * 10/2024  Kendall ............... A01C 17/008
(Continued)

FOREIGN PATENT DOCUMENTS

| CN | 204305613 U | 5/2015 |
| DE | 19636636 A1 | 3/1998 |

(Continued)

OTHER PUBLICATIONS

International Search Report and Written opinion dated Apr. 13, 2021 pertaining to PCT Application No. PCT/EP2021/053125 filed Feb. 10, 2021.
(Continued)

*Primary Examiner* — Joseph A Greenlund
(74) *Attorney, Agent, or Firm* — Leason Ellis LLP

(57) ABSTRACT

The invention relates to a method for operating an agricultural spreader (1), comprising: providing a spreading material in a material reservoir (5) of an agricultural spreader (1); dosing the spreading material from the material reservoir (5) through a dosing opening (6); receiving the dosed spreading material by a spreader device (7); and spreading the dosed spreading material by the spreader device (7); the method further comprising: detecting digital image data by a moni-
(Continued)

Figure 1:
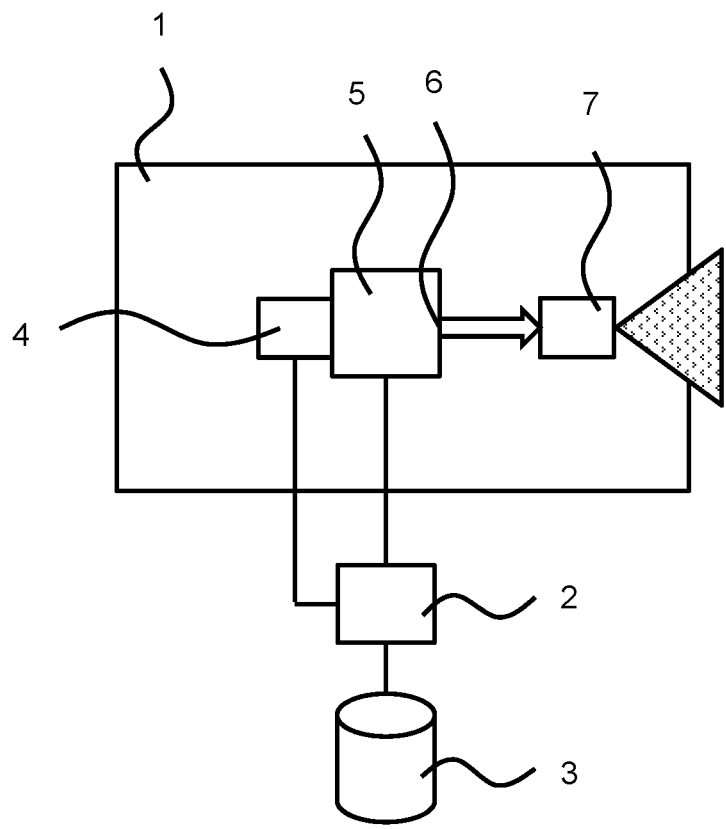

toring device (4), the digital image data being indicative of a partial quantity of the spreading material located in the vicinity of the dosing opening (6) at the time of detecting the digital image data; and determining a material parameter for the partial quantity of the spreading material located in the vicinity of the dosing opening (6) from analyzing the digital image data by a control device (2). Furthermore, an arrangement for an agricultural spreader (1) system is provided.

18 Claims, 3 Drawing Sheets

(51) Int. Cl.
   *G06N 3/08* (2023.01)
   *G06T 7/62* (2017.01)
(52) U.S. Cl.
   CPC .. *A01C 17/001* (2013.01); *G06T 2207/20081* (2013.01); *G06T 2207/20084* (2013.01); *G06T 2207/30188* (2013.01)

(56) References Cited

U.S. PATENT DOCUMENTS

| | | | | |
|---|---|---|---|---|
| 2011/0266360 A1* | 11/2011 | Gudat | ............... | B05B 13/00 239/11 |
| 2012/0036914 A1* | 2/2012 | Landphair | ............... | A01C 7/081 73/1.16 |
| 2016/0245678 A1* | 8/2016 | Yang | ............... | A01M 7/0089 |
| 2018/0085776 A1* | 3/2018 | Meyer | ............... | B29B 13/022 |
| 2018/0092295 A1* | 4/2018 | Sugumaran | ............... | A01C 14/00 |
| 2020/0245542 A1* | 8/2020 | Stuart | ............... | B01F 27/72 |
| 2020/0246769 A1* | 8/2020 | Pidwerbesky | ............... | B01F 35/79 |
| 2021/0121836 A1* | 4/2021 | Pidwerbesky | ............... | B01F 35/413 |
| 2021/0127566 A1* | 5/2021 | Harmon | ............... | A01C 7/107 |
| 2021/0253249 A1* | 8/2021 | Bian | ............... | B64D 1/16 |
| 2022/0174861 A1* | 6/2022 | De Boer | ............... | G06N 3/08 |
| 2022/0314255 A1* | 10/2022 | Beers | ............... | B05B 15/20 |
| 2023/0145904 A1* | 5/2023 | De Boer | ............... | G01B 11/026 382/103 |
| 2023/0345862 A1* | 11/2023 | Gotzen | ............... | A01C 7/124 |

FOREIGN PATENT DOCUMENTS

| | | | | |
|---|---|---|---|---|
| EP | 829194 A1 | 3/1998 | | |
| EP | 1662247 A1 * | 5/2006 | ............ | A01C 7/105 |
| EP | 2826356 A1 | 1/2015 | | |
| EP | 2924417 A2 | 9/2015 | | |
| WO | 9524823 A1 | 9/1995 | | |
| WO | WO-2020109010 A1 * | 6/2020 | ........... | A01C 17/008 |

OTHER PUBLICATIONS

European Search Report dated Jul. 15, 2020 pertaining to European Application No. 20157214.6 filed Feb. 13, 2020.
RU Office Action, Application No. 2021128253/10(059667), Dated May 23, 2024, 7 Pages. 2024.
RU Search Report, Application No. 2021128253/10(059667), Dated May 21, 2024, 2 Pages. 2024.

* cited by examiner

METHOD FOR OPERATING AN AGRICULTURAL SPREADER AND AN ARRANGEMENT FOR AN AGRICULTURAL SPREADER SYSTEM

CROSS-REFERENCES TO RELATED APPLICATIONS

This application is a national-stage application under 35 U.S.C. § 371 of International Application No. PCT/EP2021/053125, filed Feb. 10, 2021, which international application claims the benefit of priority to European Patent Application No. 20157214.6, filed Feb. 13, 2020.

The present disclosure refers to a method for operating an agricultural spreader and an arrangement for an agricultural spreader system.

BACKGROUND

Agricultural spreaders are applied for distributing a spreading material on the field, such as fertilizer material. The spreading material is usually received in a reservoir which may also be referred to as hopper. The reservoir is provided with a dosing opening for dosing the spreading material. The dosed spreading material is to be distributed by a spreader device comprising, for example, one or more spreading discs.

The spreader may be provided on a self-propelling machine. Alternatively, the spreader may be provided by means of an implement trailed by a tractor.

In order to ensure correct application of the spreading material in the field, measures for controlling operation of the spread have been proposed. In Document EP 2 957 161 B1 a method for determining a distribution of fertilizer grains is disclosed. The distribution is accomplished by means of a fertilizer spreader, in particular across the direction of travel of the fertilizer spreader. The method is comprising the following steps: spreading a mixture of fertilizer grains with a substantially homogenous mix of the various fertilizer components; imaging the region of the ground in at least one digital camera image; localizing the fertilizer grains in the camera image; and calculating an actual distribution of the fertilizer grains in the region of the ground. An image evaluation is carried out by means of a computing unit in order to determine how the mix ration changes by the spreading.

SUMMARY

It is an object to provide a method for operating an agricultural spreader and an arrangement for an agricultural spreader system which allow for improved spreading operation.

For solving the object, a method for operating an agricultural spreader according to claim 1 is provided. Further, an arrangement for an agricultural spreader system according to claim 13 is provided. Further embodiments are disclosed in dependent claims.

According to an aspect, a method for operating an agricultural spreader is provided, the method comprising: providing a spreading material in a material reservoir of an agricultural spreader, dosing the spreading material from the material reservoir through a dosing opening, receiving the dosed spreading material by a spreader device and spreading the dosed spreading material by the spreader device. The method further comprises the following: detecting digital image data by a monitoring device, the digital image data being indicative of a partial quantity of the spreading material located in the vicinity of the dosing opening at the time of detecting the digital image data; and determining a material parameter for the partial quantity of the spreading material located in the vicinity of the dosing opening from analyzing the digital image data by a control device.

According to a further aspect, an arrangement for an agricultural spreader system is provided, the arrangement comprising: a material reservoir configured to receive a spreading material, a dosing opening provided in the material reservoir and configured to dose the spreading material from the material reservoir through the dosing opening, a spreader device configured to receive and spread the dosed spreading material, a monitoring device and a control device. The arrangement is configured to: detect digital image data by the monitoring device, the digital image data being indicative of a partial quantity of the spreading material located in the vicinity of the dosing opening at the time of detecting the digital image data; and determine a material parameter for the partial quantity of the spreading material located in the vicinity of the dosing opening from analyzing the digital image data by a control device.

At least one of the agricultural spreader and the spreader system may be provided with a self-propelling machine carrying at least the material reservoir, the spreader device, the monitoring device and the control device. Alternatively, the agricultural spreader and the spreader system may be provided by means of an implement trailed by a tractor.

The control device applied for determining the material parameter may be provided in part or fully on the agricultural spreader system, for example by a user terminal. As an alternative, one or more components of the control device may be provided in a remote location. For example, a server device and/or a database may be provided in a location remotely from the agricultural spreader on the field. Data may be exchanged with the remote device by wireless data communication. In addition or as an alternative, one or more components of the control device may be implemented on a handheld device such as a mobile phone or a laptop computer. Again, exchange of electronic data may be conducted by wireless data communication with computer or data processing devices provided on the agricultural spreader itself.

The method may further comprise the following: determining a control operation parameter for the agricultural spreader in response to determining the material parameter by the control device; and applying the control operation parameter for controlling operation of the agricultural spreader. The operation of the agricultural spreader is controlled in dependence on one or more material parameters which are determined for the partial quantity of the spreading material located in the vicinity of the dosing opening at the time of detecting the digital image data. Thus, controlling operation of the agricultural spreader based on the control operation parameter which in turn is derived in response to determining the material parameter will ensure an operation control configured for such spreading material which at the time of detecting the digital image data is about to be dosed through the dosing opening and following will be spread by means of the spreader device. By applying such technology the operation of the spreader device can always be adjusted to the specific spreading material which is to be distributed next to the ground or field.

In an embodiment, the control operation parameter may be a control operation parameter for controlling operation of the tractor or the self-propelling machine of the agricultural spreader/the spreader system. For example, a driving speed may be controlled in dependence on the material parameter determined. Such controlling, for example, may be applied by means of a so-called tractor-implement-management (TIM).

The monitoring may comprise continuously monitoring the spreading material located in the vicinity of the dosing opening while dosing the spreading material through the dosing opening. A plurality of images may be continuously taken by the monitoring device which, for example, may be provided with a digital camera, for detecting a stream or a group of digital image data indicative of the plurality of images taken. Separated images or a plurality of images continuously detected may be analysed by processing the digital image data by means of one or more data processors conducting image data analysis. Different methods are known as such for image data analysis and may be applied depending on the embodiment.

The method may further comprise conducting at least one of determining the material parameter, determining control operation parameter, and applying the control operation parameter in a real time process. The real time process may involve a continuous input of digital image data. Similarly, the material parameter and/or the control operation parameter may be continuously determined for finally applying the control operation parameter for continuously controlling operation of the agricultural machine in dependence on the digital image data and the material parameter determined from such digital image data.

The detecting of the digital image data may comprise time resolved detecting digital image data by the monitoring device. For example, the digital image data are assigned a timestamp indicative of the time when the digital data are detected. Such time information may be taken into account in the process of determining the control operation parameter. For example, a time delay may be determined for applying the control operation parameter with respect to the time of detecting the digital image data from which the material parameter is determined.

The determining of the material parameter may comprise determining, for the partial quantity of the spreading material located in the vicinity of the dosing opening, at least one material parameter from the following group: particle size for particles of the partial quantity of the spreading material; particle diameter for particles of the partial quantity of the spreading material; particle shape for particles of the partial quantity of the spreading material; particle density per unit volume unit for particles of the partial quantity of the spreading material; particle type for particles of the partial quantity of the spreading material; filling volume indicative of degree of filling of a volume in the vicinity of the dosing opening, the spreading material fed through the volume towards the dosing opening; and flow parameter indicative of a material flow of the particles of the partial quantity of the spreading material towards the dosing opening. Information about one of the particle size, the particle shape, and/or the particle density may be used or analysed for determining the particle type of particles of the partial quantity of spreading material. For example, in a database information may be available about different characteristic parameters for different particle types. Comparing one or more of the material parameters derived or determined from the digital image data with such information stored in the database may allow for determining one or more specific types of spreading material. In another example, time resolved digital image data collected by the monitoring device may be indicative of flow characteristics of the flow of the spreading material towards the dosing opening. In response, a control operation parameter may be determined for amending status of the dosing opening. For example, the size of the dosing opening may be increased or decreased for amending flow characteristics of the spreading material fed through the dosing opening for leaving the material reservoir towards the spreader device.

The determining of the control operation parameter may comprise determining at least one control operation parameter from the following group: dosing device parameter such as at least one of size of dosing opening, and shape of dosing opening; degree of filling of the material reservoir; operator warning; and control operation parameter for the spreader device such as at least one of speed of rotation of a spreader disc, drop location on the spreader disc, and working width. As an alternative or in addition, a parameter related to border spreading settings may be determined as a control operation parameter.

The determining may comprise applying a neural network for at least one of the determining of the material parameter and the determining of the control operation parameter. The neural network may be trained by training data comprising a plurality of digital image data provided for different types of spreading material. Alternatively, other computer models reflecting some relationship between digital image data and material parameter, and/or the material parameter and the control operation parameter may be applied. The control device will apply the neural network and/or some other computer model for finally determining the control operation parameter to be applied for controlling operation of the agricultural spreader. The computer model may convert spreading material properties or parameters such as fertilizer properties to control operation parameter(s) providing for an operation setup of the agricultural spreader. A combination of algorithm(s) and a database may be applied by the computer model or the neural network. The database may filled with settings determined experimentally by a spreader test station.

The detecting of the digital image data may comprise detecting digital image data by a monitoring device provided in proximity to the dosing opening, i.e. physical or spatial proximity. For this embodiment the monitoring device itself is located near or in proximity to the dosing opening. The monitoring device may be provided inside or outside the material reservoir.

The detecting of the digital image data may comprise detecting digital image data through an opening in a wall element of a side wall of the material reservoir, the side wall enclosing at least partially a reservoir volume receiving the spreading material.

The detecting of the digital image data may comprise detecting digital image data through a window provided in the opening of the wall element. For this embodiment the monitoring device may be provided outside of the material reservoir in a location which allows taking digital images through the window provided in the opening of the wall element. Alternatively, the monitoring device comprising for example a digital camera may be located within the material reservoir.

The spreading by the spreading device may comprise spreading the dosed spreading material by at least one disc spreader.

The determining of the operation control parameter may comprise receiving a user input indicative of a parameter input, and taking into account the parameter input together with the material parameter for determining the operation control parameter by the control device. For example, the parameter input may be indicative of the working width and/or an amount of spreading material per ground area such as kg/ha.

As an alternative or in addition, the determining of the operation control parameter may comprise receiving sensor signals from a sensor device provided on the agricultural spreader system, for example a load sensor device. The sensor signals are taken into account for determining the operation control parameter by the control device.

The embodiments described above with respect to the method for operating the agricultural spreader may be applied to the arrangement for the agricultural spreader system mutatis mutandis.

DESCRIPTION OF EMBODIMENTS

Figure 2:
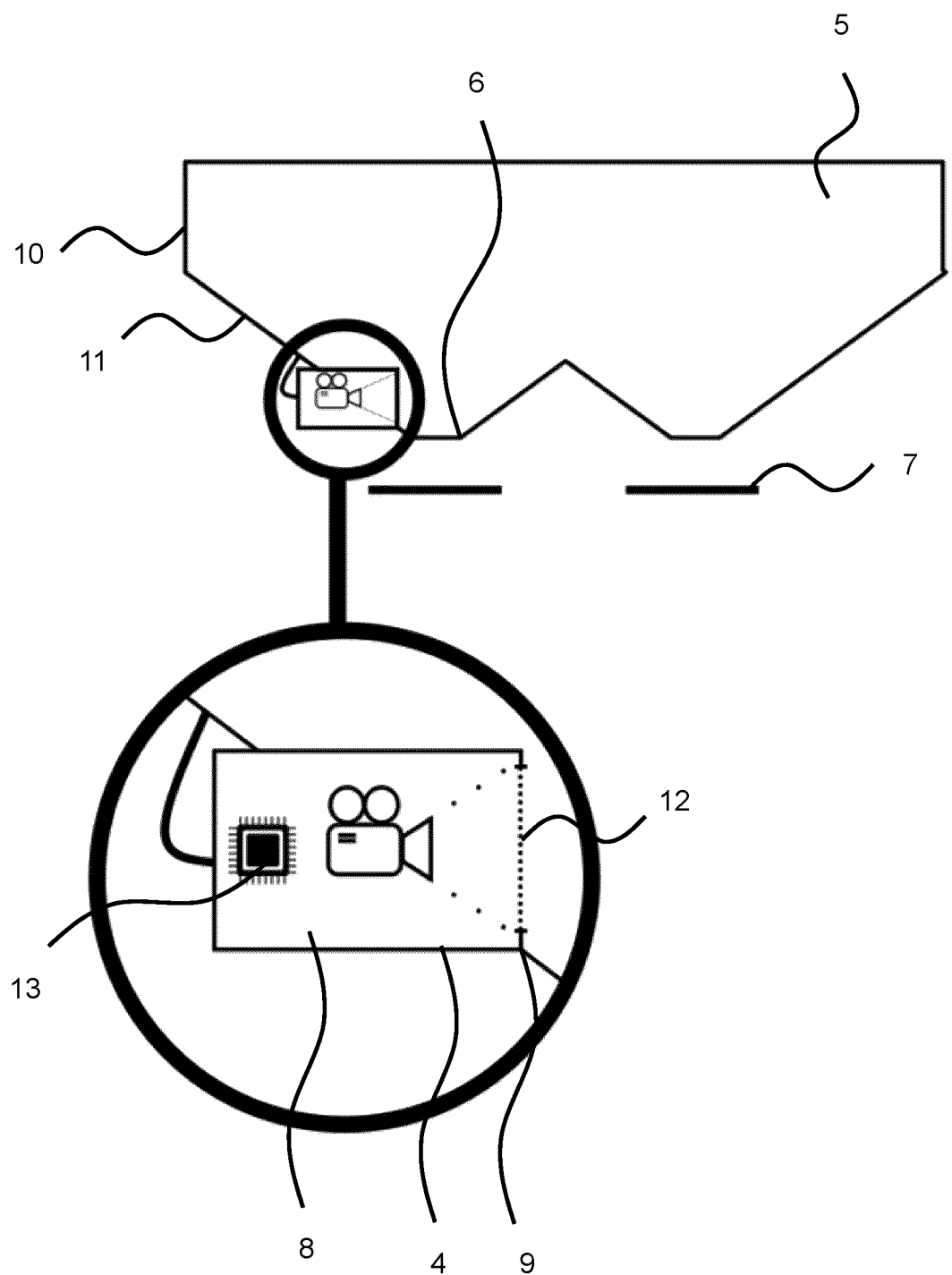
Figure 3:
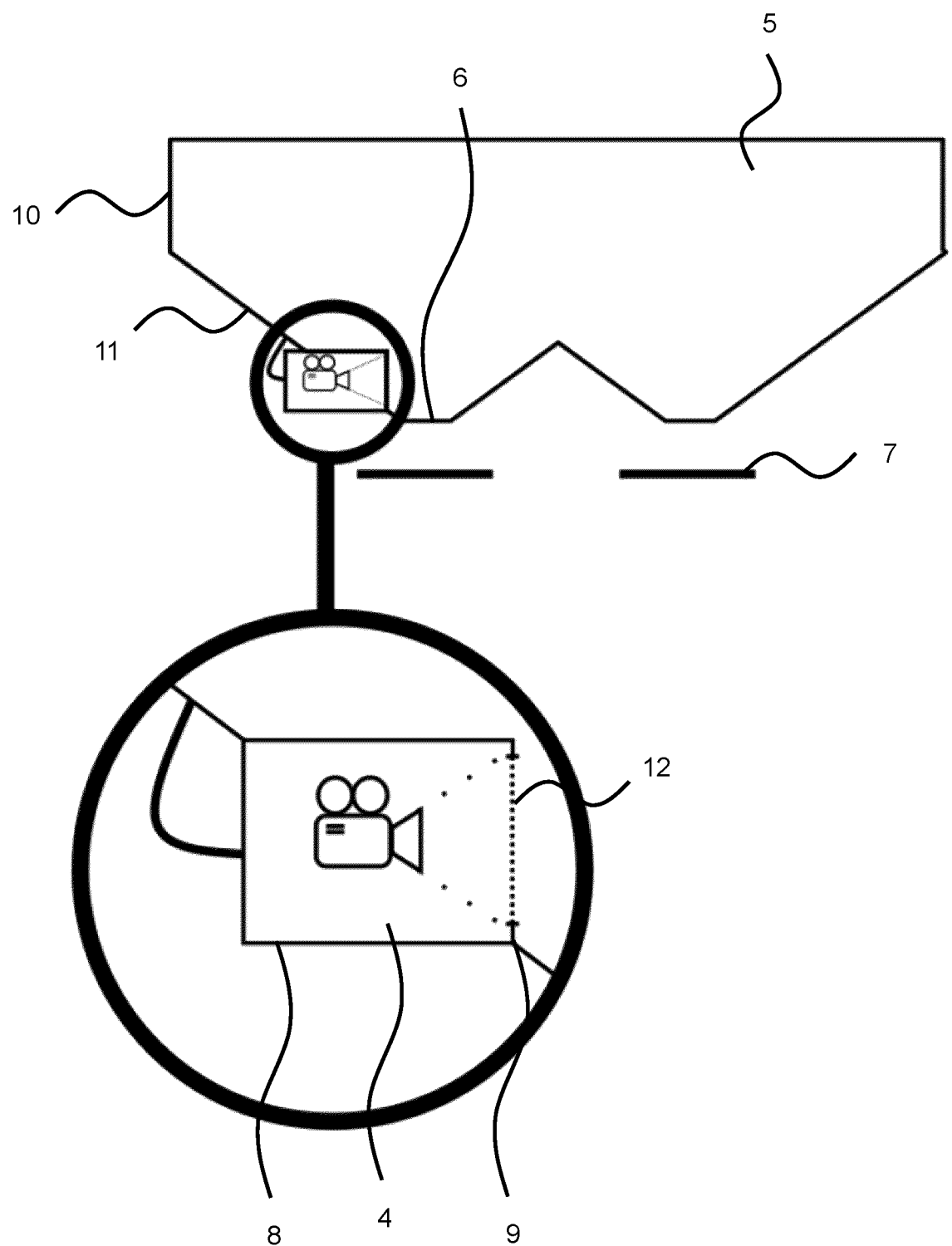

Following, further embodiments are described by referring to figures. In the figures show:

FIG. 1 a schematic block diagram of an arrangement for an agricultural spreader system;

FIG. 2 a schematic representation of an arrangement provided with a material reservoir and a monitoring device located in proximity to a dosing opening; and FIG. 3 a schematic representation of another arrangement provided with a reservoir material and monitoring device located in proximity to the dosing opening.

FIG. 1 shows a schematic block diagram of an arrangement for an agricultural spreader system. An agricultural spreader 1 is provided and configured for spreading or distributing a spreading material (grain material) such as fertilizer to the ground or field. Different agricultural spreaders are known as such. For example, the agricultural spreader may be provided on a self-propelling machine. Alternatively, the agricultural spreader may be provided with an implement trailed by a tractor. A control device 2 is configured to provide operation control parameters to be applied to the agricultural spreader 1 for controlling operation. The control device 2 may be implemented together with the agricultural spreader 1 or may be at least partially separated from the agricultural spreader 1. For example, elements or components of the control device 2 may be provided on the tractor.

The control device 2 is configured to exchange electronic data with a database 3 located remotely from the control device 2. For example, the database 3 may be provided in a remote server station. Wireless data communication may be applied for exchanging electronic data.

The agricultural spreader 1 is provided with a monitoring device 4 configured to detect digital image data. The monitoring device 4 is assigned to a material reservoir 5 of the agricultural spreader 1 (see FIGS. 2 and 3). Thereby, the monitoring device 4 is configured to detect digital image data for a partial quantity of a spreading material received in the material reservoir 5, the partial quantity of the spreading material, at the time of detecting the digital image data by the monitoring device 5, being located in the vicinity of a dosing opening 6 through which the spreading material is discharged from the material reservoir 5 to a spreading device 7 which is provided, for example, with one or more disc spreader devices.

The digital image data detected by the monitoring device 4 are processed in an image data analysis by means of one or more data processors provided in at least one of the monitoring device 4 and the control device 2. By means of the image data analysis one or more material parameters are determined for the spreading material located in the vicinity of the dosing opening 6. The monitoring device 5 may comprising a digital camera for detecting the digital image data.

In response to determining the one or more material parameter such as particle size, particle diameter and/or particle shape, an operation control parameter for operating the agricultural spreader 1 is determined by the one or more data processors. For example, there may be a look up table in the remote database 3 which provides assignment between material parameter(s) on one side and operation control parameter(s) on the other side. If some specific material parameter is determined from the image data analysis, one or more operation control parameters may be determined which are assigned to such material parameter. Following, the one or more operation control parameters are applied for operating or controlling the agricultural spreader 1 while the spreading material is distributed to the ground or field. For example, the size of the dosing opening 6 may be adjusted in response to determining some specific particle size from the digital image data. Also other operation control parameters may be amended or changed in response to determining specific material parameter(s).

When the spreading material is present in the material reservoir 5 (hopper) the monitoring device 4 will once or periodically detect digital image data from this spreading material and send these digital image data to the control device 2. It may also request settings from the spreader controller or terminal, such as working width and application rate.

When the digital image data is received, the control device 4 will start to process this information. The digital image data may be run through a neural network to obtain the physical properties (material parameters). These properties may combined with spreader settings and may then be used to search for settings in the database 3. These settings are then returned back to the control device 3. When the settings have been received by the control device 2, it will forward these settings to the spreader electronics, thereby, applying the settings (operation control parameter(s)) to the agricultural spreader 1.

FIGS. 2 and 3 show different examples for an arrangement provided with the material reservoir 5 which may also be referred to as hopper and the monitoring device 4 located in the vicinity of or in proximity to the dosing opening 6 through which the spreading material is dosed to the spreading device 7. There are two dosing openings 6 and two spreading devices 7 in the example shown. The monitoring device 4 is received in a device housing or box 8 placed within an opening 9 provided in a wall element 10 of a side wall 11 of the material reservoir 2. Digital image data are collected by the monitoring device 4 through a (transparent) window 12.

For the embodiment shown in FIG. 2, a digital image processor device 13 is provided within the device box 8. Digital image data detected by the monitoring device 4 may be processed at least in part locally within the device box 8.

The monitoring device 4 may be operated for be continuously detecting digital image data of the spreading material during operation. Many spreading materials such as many fertilizers do not have a very consistent particle size. During the fabrication process of the spreading material the diameter of the particles varies because of various hard to control factors. During storage, transportation and repackaging of the spreading material such as fertilizer the different particles sizes tend to separate, resulting in batches with larger granules and batches with smaller granules. By continuously making digital image data the agricultural spreader 1 can adjust itself on the fly (in real time) depending on which particles are currently close to the dosing opening 6.

By combining the monitoring device 4 with an on-board information controller such as the digital image processor device 13, the system can work completely or in part autonomously. The monitoring device 13 would make digital image data of the spreading material when requested by the control device 4.

In different embodiments, the control device 4 could interface with at least one of the following: a software application on a terminal provided on the tractor; a software application on a mobile phone (Bluetooth); a spreader controller (CAN, proprietary or could be on the same chipset); and an online in the cloud advice service.

In different embodiments, the control device 4 could provide at least one functionality from the group: run a neural network for recognizing the fertilizer particle shape or/and size; run Computer Vision algorithms to pre-process the image data or recognize properties; host the advice service; and gather and combine other data from the terminal, spreader controller or external sensors.

A deep neural network (DNN) may be applied to process the digital image data into useable physical properties (material parameters). One of the material parameters, namely the particle size or particle diameter, may be determined. For example, this can either be conducted by classifying the spreading material in certain categories, for example: fine (1 mm), small (1.8 mm), normal (2.5 mm), large (3.5 mm), very large (5 mm+). Alternatively, the particle size can be determined by regressing the digital image data into just one average diameter (x mm).

The DNN may also be used to recognize at least one of the shape and the category of the spreading material such as fertilizer. This is done with a classification regressor neural network. For each category of fertilizer the DNN will return a number between 0 to 1 indicating how likely it is that the photographed spreading material is having a certain shape.

The DNN can be located on either a local information controller on the agricultural spreader 1, a local software application for mobile phone or hosted in the cloud. The cloud may provide for the opportunity to collect digital image data from customers or users, these can be then be used to retrain the DNN so it keeps evolving.

The DNN may be hosted on the control device 4 on the agricultural spreader 1. If it is combined with a local advice service and database, the agricultural spreader 1 can setup itself completely automatic and offline. Continuously updating the settings depending on the current changed would become a possibility.

The features disclosed in this specification, the figures and/or the claims may be material for the realization of various embodiments, taken in isolation or in various combinations thereof.

The invention claimed is:

1. A method for operating an agricultural spreader, comprising:
   providing a spreading material in a material reservoir of an agricultural spreader;
   dosing the spreading material from the material reservoir through a dosing opening formed in a wall element of a bottom wall of the material reservoir through which the spreading material is directly discharged from the material reservoir to a spreader device configured to receive and spread the dosed spreading material;
   receiving the dosed spreading material by the spreader device;
   spreading the dosed spreading material by the spreader device;
   detecting digital image data by a monitoring device, the digital image data being indicative of a partial quantity of the spreading material located in a lower half of the material reservoir in proximity to the dosing opening at the time of detecting the digital image data, wherein the monitoring device is located above the dosing opening; and
   determining a material parameter for the partial quantity of the spreading material located in the material reservoir in proximity to the dosing opening and being about to be dosed through the dosing opening from analyzing the digital image data by a control device.

2. The method of claim 1, further comprising:
   determining a control operation parameter for the agricultural spreader in response to determining the material parameter by the control device; and
   applying the control operation parameter for controlling operation of the agricultural spreader.

3. The method of claim 1, wherein the monitoring device continuously monitors the spreading material located in a lower half of the material reservoir while the spreading material is dosed through the dosing opening.

4. The method of claim 2, further comprising applying the control operation parameter in a real time process.

5. The method of claim 1, wherein the detecting of the digital image data comprises time resolved detecting digital image data by the monitoring device.

6. The method of claim 1, wherein the determining of the material parameter comprises determining, for the partial quantity of the spreading material located in a lower half of the material reservoir in proximity to the dosing opening, at least one material parameter from the following group:
   a particle size for particles of the partial quantity of the spreading material;
   a particle diameter for particles of the partial quantity of the spreading material;
   a particle shape for particles of the partial quantity of the spreading material;
   a particle density per unit volume for particles of the partial quantity of the spreading material;
   a particle type for particles of the partial quantity of the spreading material;
   a filling volume indicative of degree of filling of a volume immediately upstream of the dosing opening, the spreading material fed through the volume towards the dosing opening; and
   a flow parameter indicative of a material flow of the particles of the partial quantity of the spreading material towards the dosing opening.

7. The method of claim 2, wherein the determining of the control operation parameter comprises determining at least one control operation parameter from the group consisting of:
   a dosing device parameter such as at least one of size of dosing opening, and shape of dosing opening;
   a degree of filling of the material reservoir;
   an operator warning; and
   a control operation parameter for the spreader device such as at least one of speed of rotation of a spreader disc, drop location on the spreader disc, and working width.

8. The method of claim 2, further comprising applying a neural network for at least one of the determining of the material parameter and the determining of the control operation parameter.

9. The method of claim 1, wherein the detecting of the digital image data comprises detecting digital image data by the monitoring device provided in proximity to the dosing opening.

10. The method of claim 1, wherein the detecting of the digital image data comprises detecting digital image data through an opening in a wall element of a side wall of the material reservoir, the side wall enclosing at least partially a reservoir volume receiving the spreading material.

11. The method of claim 10, wherein the detecting of the digital image data comprises detecting digital image data through a window provided in the opening of the wall element.

12. The method of claim 1, wherein the spreading by the spreading device comprises spreading the dosed spreading material by at least one disc spreader.

13. An arrangement for an agricultural spreader system, comprising:
- a material reservoir configured to receive a spreading material;
- a dosing opening formed in a wall element of a bottom wall of the material reservoir and configured to dose the spreading material from the material reservoir and through which the spreading material is directly discharged from the material reservoir
- a spreader device configured to receive and spread the dosed spreading material;
- a monitoring device; and
- a control device such that the arrangement is configured to:
  detect digital image data by the monitoring device, the digital image data being indicative of a partial quantity of the spreading material located in a lower half of the material reservoir in proximity to the dosing opening at the time of detecting the digital image data, wherein the monitoring device is located above the dosing opening; and
  determine a material parameter for the partial quantity of the spreading material located in the material reservoir in proximity to the dosing opening and being about to be dosed through the dosing opening from analyzing the digital image data by a control device.

14. The method of claim 8, wherein the neural network is trained using the detected digital image data.

15. The method of claim 14, wherein the trained neural network determines at least one of the material parameter and the control operation parameter.

16. The method of claim 15, wherein an operation setup of the agricultural spreader is established by using the trained neural network to convert the material parameter to the control operation parameter.

17. The method of claim 16, wherein the material parameter comprises at least one fertilizer property.

18. The method of claim 8, wherein an output of the neural network is produced by comparing results generated by the neural network against baseline data comprising at least one setting that has been determined experimentally by a spreader test station.

* * * * *